Sept. 1, 1953 R. BACCHI 2,650,503
CONE VALVE OPERATOR
Filed Nov. 9, 1951 4 Sheets-Sheet 1
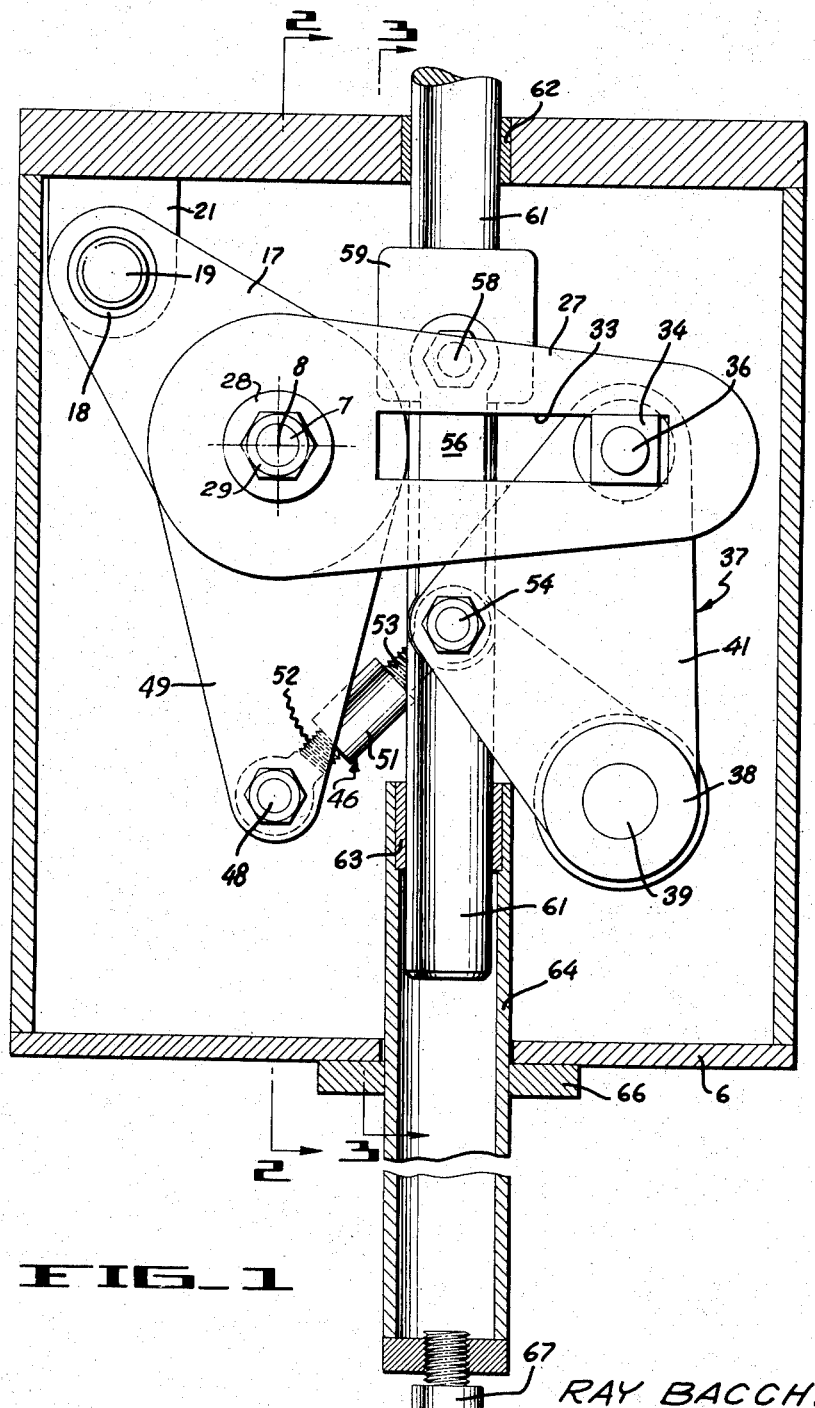
FIG_1
RAY BACCHI
INVENTOR
BY
ATTORNEY

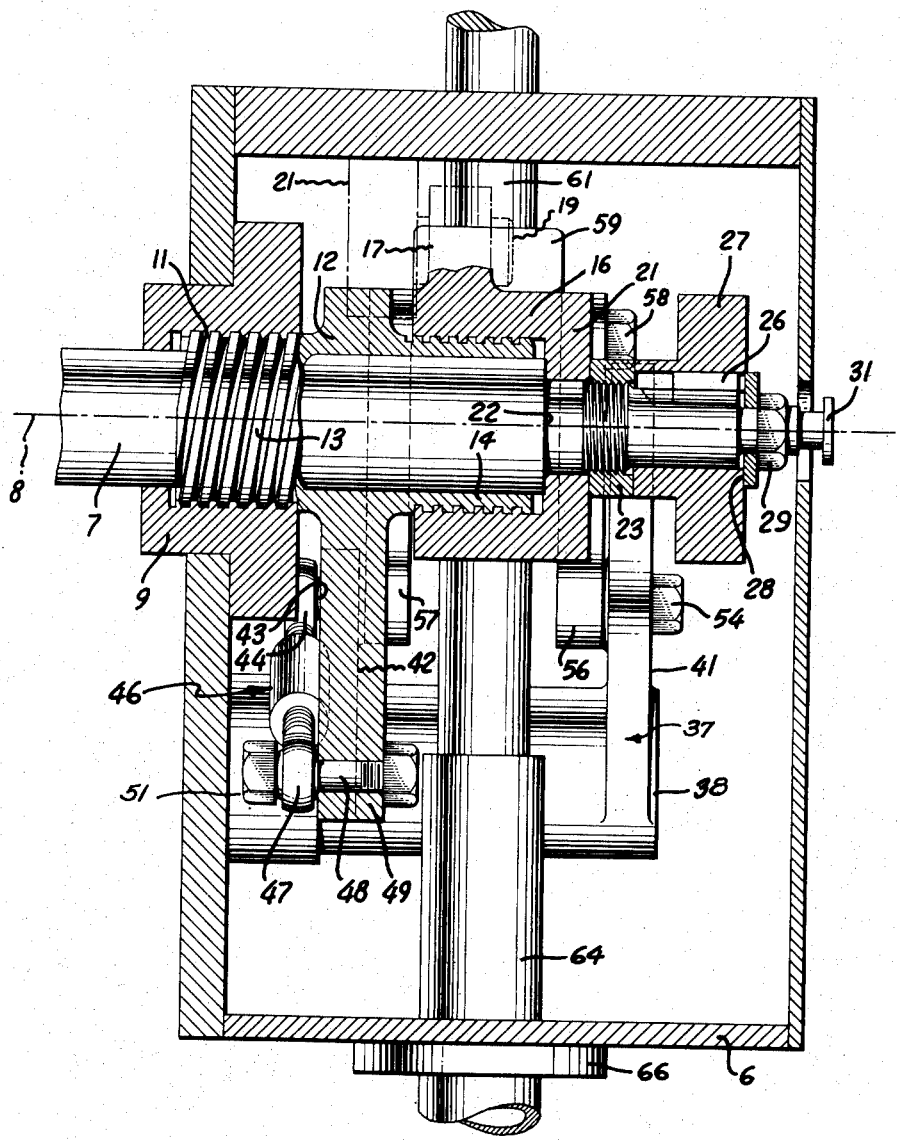
FIG_2

Sept. 1, 1953 R. BACCHI 2,650,503
CONE VALVE OPERATOR
Filed Nov. 9, 1951 4 Sheets-Sheet 3
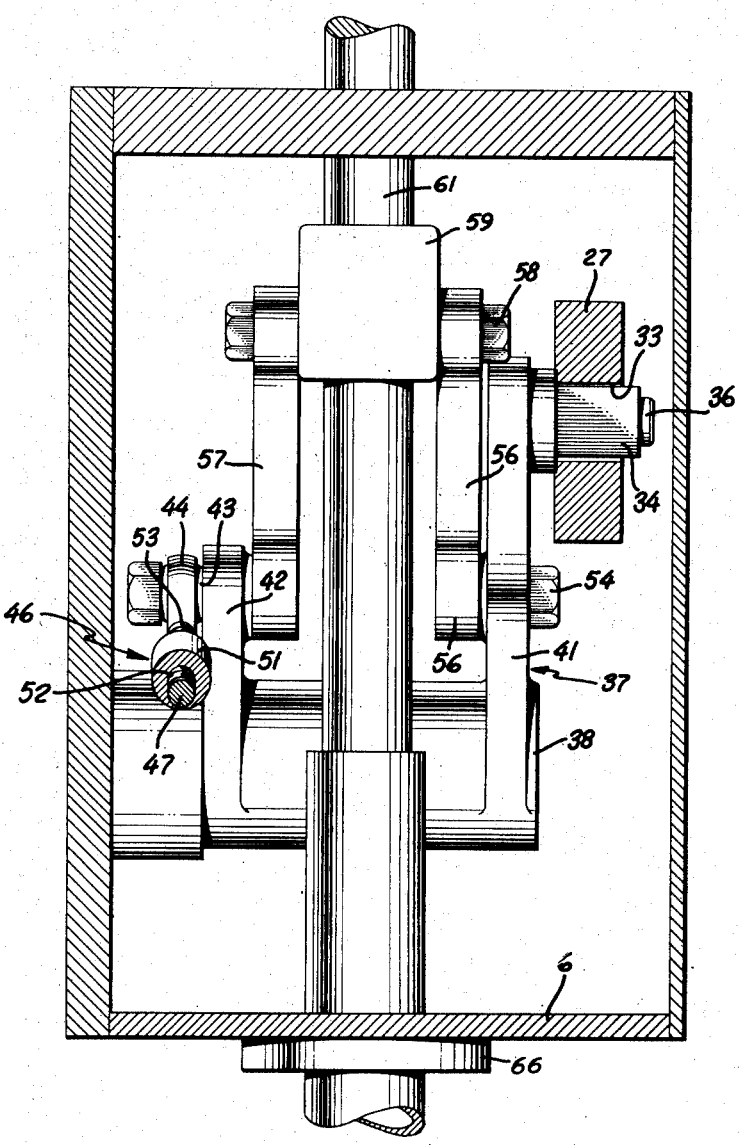
FIG_3
RAY BACCHI
INVENTOR
BY
ATTORNEY Sept. 1, 1953  R. BACCHI  2,650,503
CONE VALVE OPERATOR
Filed Nov. 9, 1951  4 Sheets-Sheet 4
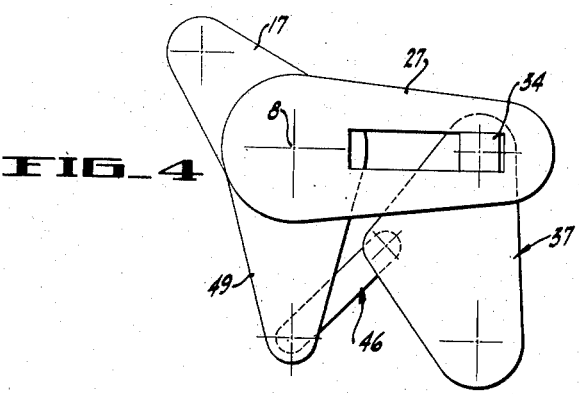
FIG_4
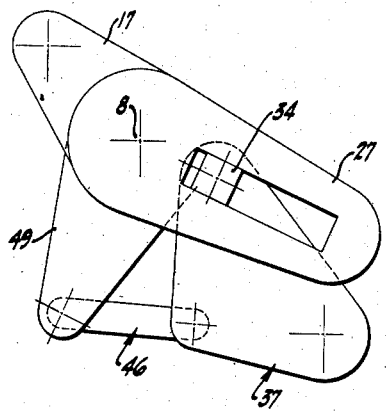
FIG_5
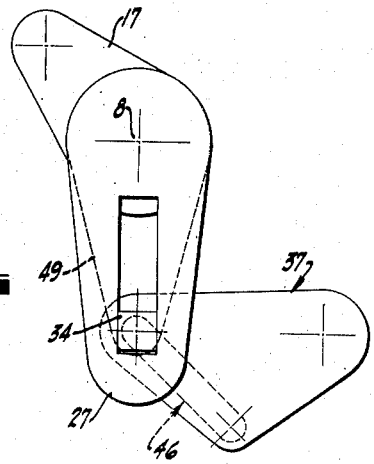
FIG_6
RAY BACCHI
INVENTOR.
BY
ATTORNEY Patented Sept. 1, 1953

2,650,503

UNITED STATES PATENT OFFICE 2,650,503

CONE VALVE OPERATOR

Ray Bacchi, Daly City, Calif., assignor to The Pelton Water Wheel Company, San Francisco, Calif., a corporation of California Application November 9, 1951, Serial No. 255,717

6 Claims. (Cl. 74—22)

My invention relates generally to large water works type cone valves and especially to means for moving the valve cone toward and away from its seat and for rotating the cone. Valves of this general sort are shown in the patent of Ira Morgan White, et al., No. 2,565,640, issued August 28, 1951 and entitled Cone Valve Operator. They usually involve a very large casing in which a valve cone is situated with the cone axis vertically disposed. The valve operator has the function of lifting the valve cone from its seat in one extreme position and, during or subsequent to the lifting, rotating the valve cone to its other extreme position and either simultaneously therewith or subsequently thereto moving the cone to its seat in the other extreme position. There are many devices in the patent literature for this operation and some of them are satisfactory although there remains a problem of providing sufficient displacement of the valve cone from the seat and a proper interrelationship of the axial motion of the valve cone and its rotary motion.

It is therefore an object of my invention to provide an improved cone valve operator.

A still further object of my invention is to provide a cone valve operator in which a greater than usual lift or axial translation is given to the valve cone.

A still further object of my invention is to provide means for affecting a relative adjustment or relative selected relationship between the amount of rotation of the valve cone and the valve cone seated position.

Other objects, together with the foregoing, are attained in the cone valve operator described in the accompanying description and illustrated in the accompanying drawings, in which Figure 1 is a plan of a cone valve operator according to my invention, parts of the casing and attendant mechanism being shown in planar cross section.

Figure 2 is a cross section of the structure of Figure 1, the plane of section being indicated by the line 2—2 of Figure 1.

Figure 3 is a cross section, the plane of which is indicated by the line 3—3 of Figure 1.

Figure 4 is a schematic view showing the parts in one extreme position, as illustrated in Figure 1.

Figure 5 is a schematic view showing the parts in an intermediate position.

Figure 6 is a schematic view showing the parts in another extreme position.

The cone valve operator of my invention can be incorporated in a number of different forms depending partially on the environment in which it is to be utilized, depending upon preferred design variations, and upon the service to which it is to be put. It has successfully been incorporated in the form illustrated herein. In the present disclosure, the mechanism of the cone valve casing and of the valve cone itself have been omitted since they are substantially standard. It is assumed for the present description that somewhat distinct from customary practice the axis of rotation and translation of the valve cone, as represented by the valve stem, is substantially horizontal with the operator casing 6 being disposed at one end of and secured to the valve itself.

The casing 6 serves as the mounting for the various portions of the cone valve operator and is disposed to give ready access to the valve stem 7 located with its axis 8 in substantially a horizontal position. The stem 7 passes into the casing through one portion of a first nut 9 firmly secured in position in the casing 6 and being provided with an internal thread 11 of a predetermined pitch.

Designed to surround the stem 7, although not fixed thereto, is a member in the form of a sleeve 12 having a first threaded portion 13 fitting the threaded nut 9 and having an oppositely threaded portion 14 at its opposite end designed to interengage with a second internally threaded nut 16, also coaxial with stem 7. The second nut 16 is formed with an extended arm 17 having an anti-friction bushing 18 surrounding a stationary pin 19 projecting from a bracket 21 secured firmly to the casing 6.

Rotation of the sleeve 12 not only causes the sleeve to translate axially with respect to the nut 9 but also causes translation of the nut 16 and since the threads are of opposite hand and are usually made of the same pitch the nut 16 is translated axially substantially twice as far with respect to the casing 6 as the translation of the rotated sleeve 12. This is because the nut 16, although freely translatable, is precluded from rotation inasmuch as the arm 17 is rotatably fixed by the pin 19 with respect to the casing although it is freely slidable axially on the pin 19 by reason of the anti-friction bushing 18.

Advantage is take of the axial movement 16 of the nut at substantially twice the amount of the axial translation of the sleeve 12 to provide a correspondingly great axial translation of the stem 7. That is accomplished by a collar 21 preferably formed integrally with the second nut 16 and confined against a shoulder 22 on the stem 7. The collar is also confined by a securing nut 23 threaded on the stem 7 and lightly engaging the collar 21 so that the collar and stem 7 are relatively rotatable but are not relatively movable in an axial direction. Consequently, axial movement of the nut 16 produces an exactly equivalent axial movement of the stem 7 and moves the valve cone (not shown) in a corresponding fashion.

Since it is desired to rotate the valve cone with respect to its housing, it is necessary to rotate the stem 7 with respect to the casing 6. The extreme end of the valve stem 7 is provided with a key 26 engaging also with a forked lever 27. The forked lever is not only made fast on the stem 7 with respect to relative rotation, but is likewise confined against relative axial translation. One end of the forked lever hub butts against the nut 23 whereas the other end butts against a washer 28 secured in position by a fastening nut 29. An indicator button 31 is screwed onto the shaft 7 and projects through the casing 6 to disclose the rotated and axially displaced position of the valve stem.

The forked lever 27 is provided with a radially extending slot 33 having parallel side walls forming bearing surfaces for a block 34 mounted on a pin 36. An actuating lever 37 is provided with a central hub 38 journalled on a shaft 39 fast in the casing 6 and is provided with a pair of arms 41 and 42. The pin 36 is secured in and projects from the arm 41. By this interconnection, rotation of the actuating lever 37 causes a corresponding swinging of the block 34 within the slot 33 and correspondingly rotates or swings the arm 27 and thus turns the valve stem 7. Preferably, the location of the pin 36 in one extreme position of the actuating lever 37 is such that the stem 7, the pin 36, and the shaft 39 are at the apices of a right triangle. Thus, the initial rotary movement of the lever 37 produces substantially no rotation of the lever 27 about the axis 8. The motion however becomes relatively the same as the block 34 advances radially inwardly of the slot 33 until finally a greatly accelerated motion is provided when the block 34 is adjacent the radially smaller end of the slot 33.

It is desired that the motion of the actuator 37 likewise be communicated to the member 12. For that reason the actuator arm 42 is provided with a pin 43 leading by means of an articulation 44 to a link 46. This link is provided with an articulation 47 joined to a pin 48 secured in the outer portion of an arm 49 integrally formed with the sleeve 12. Since the sleeve moves axially with respect to the casing 6 and in addition rotates relative thereto but since the actuating lever 37 has all of its points moving in a plane relative to the casing 6, it is arranged that the articulations 44 and 47 accommodate not only the relative rotation but also some axial movement. That is accomplished by making each of the articulations 44 and 47 a ball and socket connection so that the link 46 is not always parallel to the plane of the casing 6 but assumes various angles relative thereto as the parts go through their sundry motions. By this arrangement the actuating lever 37 is effective simultaneously to move the block 34 and to swing the arm 49 and correspondingly rotate the sleeve 12.

Since the relative location of the parts is preferably variable under different circumstances, the link 46 is not made as a solid member, normally, but preferably incorporates a central tube 51 provided with internal threads of opposite hand engaging threaded portions 52 and 53 so that upon rotation of the tube 51 the distance between the pin 43 and the pin 48 is varied.

In order to move the actuating lever 37 in the desired fashion, there are provided pin connections 54 between the arms 41 and 42 and a pair of links 56 and 57 themselves connected by pins 58 to a block 59. The block is mounted at the end of a piston rod 61 translatable in a bushing 62 in the wall of the casing 6. The piston rod 61 extends from the customary hydraulically expansible jack mechanism (not shown) usually utilized for cone valve operators. The piston rod 61 also is relatively long to operate in a bushing 63 carried by a tube 64 mounted by a flange 66 on the wall of the casing 6 and provided with an end stop 67 so that the piston rod 61 is well supported on opposite sides of the operator mechanism yet has its stroke limited by an appropriate adjustment of the stop 67. By setting of this adjustment and of a companion adjustment (not shown) at the other end of the piston rod, the angular position of the valve cone at the extremes of stroke can be established.

In the operation of the structure, upon hydraulic operation of the jack (not shown) the piston rod 61 is translated and the links 56 and 57 are simultaneously moved to rotate the actuating lever 37 about the pin 39. This produces simultaneous motion of the block 34 and, acting through the link 46, also of the arm 49. While the arm 49 produces an immediate lifting on the stem 7 through the threaded interconnection with the stationary nut 9 and the movable nut 16, the initial movement of the block 34 in the slot 33 (Figures 1 and 4) produces theoretically zero rotation of the forked lever 27. However, the valve is effectively lifted (moved axially away from its seat) and immediately begins its rotation. Sometimes, due to the elasticity and yielding nature of some of the parts, the valve may actually leave its seat before any substantial turning occurs even though a turning impulse is imposed upon the valve stem immediately after the block 34 leaves its 90 degree position.

The continued translation of the piston rod 61 moves the block 34 into its closest approach to the stem 7 and past that position during which time the link 46 and the actuating arm 37 go through a full or straight toggle position (Figure 5) and then buckle in the opposite direction. In the final movement, the arm 49 is moved counter-cloikwise, as seen in Figure 1, its initial movement having been clockwise. The valve then re-seats in its other extreme position as the block 34 returns to position in the outermost portion of the slot 33 but at substantially 90 degrees displacement around the axis of the shaft 39 (Figure 6).

The reverse or withdrawing action of the piston rod 61 produces a reverse motion of the parts, the link 46 and actuating lever 37 going through their straight line toggle position (Figure 5) and again buckling. The block 34 again approaches the axis 8 in the slot 33 and finally recedes to resume its extreme right angle position as shown in Figures 1 and 4. The valve cone follows the stem 7 and therefore rotates from one extreme position to the other and moves away from and back to its seat as the cone rotates.

What is claimed is:

1. A cone valve operator comprising a casing, a first threaded nut fixed in said casing, a sleeve having two oppositely threaded portions, one of said threaded portions engaging said first nut, a second threaded nut engaging the other of said threaded portions, a valve stem disposed within said sleeve, a collar integral with said second nut, means for constraining said collar and said stem to relative rotation and against relative axial translation, a forked lever fast on said stem and providing a slot, an actuating lever pivoted in said casing, a pin on said actuating lever disposed in said slot, a first arm extending from said sleeve, a link articulated to said first arm and to said actuating lever, a second arm extending from said second nut, means for constraining said second arm to axial translation and against rotation relative to said casing, an actuating shaft mounted for translation in said casing, and a link articulated to said shaft and to said actuating lever.

2. A cone valve operator comprising a casing, a first threaded nut fixed in said casing, a sleeve having two oppositely threaded portions, one of said threaded portions engaging said first nut, a second threaded nut engaging the other of said threaded portions, a valve stem disposed within said sleeve, a collar integral with said second nut, means for constraining said collar and said stem to relative rotation and against relative axial translation, an actuating lever pivoted in said casing, a first arm extending from said sleeve, a link articulated to said first arm and to said actuating lever, a second arm extending from said second nut, means for constraining said second arm to axial translation and against rotation relative to said casing, and means for moving said actuating lever.

3. A cone valve operator comprising a casing, a first threaded nut fixed in said casing, a sleeve having two oppositely threaded portions, one of said threaded portions engaging said first nut, a second threaded nut engaging the other of said threaded portions, means for constraining said second nut to axial translation and against rotation relative to said casing, a valve stem rotatable with respect to said second nut and axially constrained relative thereto, and means for rotating said sleeve relative to said casing.

4. A cone valve operator comprising a casing, a first threaded nut fixed in said casing, a sleeve having two oppositely threaded portions, one of said threaded portions engaging said first nut, a second threaded nut engaging the other of said threaded portions, means for constraining said second nut to axial translation and against rotation relative to said casing, a valve stem rotatable with respect to said second nut and axially constrained relative thereto, an arm extending from said sleeve, an actuating device mounted on said casing for movement in a plane, a link, and ball connections between said link and said actuating device and between said link and said arm.

5. A cone valve operator comprising a casing, a first threaded nut fixed in said casing, a sleeve having two oppositely threaded portions, one of said threaded portions engaging said first nut, a second threaded nut engaging the other of said threaded portions, means for constraining said second nut to axial translation and against rotation relative to said casing, a valve stem rotatable with respect to said second nut and axially constrained relative thereto, an arm extending from said sleeve, an actuating device mounted on said casing, and an extensible link articulated to said actuating device and to said arm.

6. A cone valve operator comprising a casing, a first threaded nut fixed in said casing, a member having two oppositely threaded portions, one of said threaded portions engaging said first nut, a second threaded nut engaging the other of said threaded portions, means for constraining said second nut to axial translation and against rotation relative to said casing, a valve stem mounted for axial translation with said second nut, means for rotating said member with respect to said casing in any axially translated position thereof, and means for rotating said stem with respect to said casing and with respect to said member.

RAY BACCHI.

References Cited in the file of this patent

UNITED STATES PATENTS

| Number | Name | Date |
|---|---|---|
| 2,166,840 | Goldberg | July 18, 1939 |
| 2,197,202 | Brisbane | Apr. 16, 1940 |